US012184609B2

(12) United States Patent
Chacko et al.

(10) Patent No.: US 12,184,609 B2
(45) Date of Patent: Dec. 31, 2024

(54) METHOD AND SYSTEM FOR ENHANCING COMPUTER NETWORK SECURITY

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Jose Vincent, Chennai (IN)

(73) Assignee: HCL Technologies Limited, New Delhi (IN)

(*) Notice: Subject to any disclaimer, the term of this patent is extended or adjusted under 35 U.S.C. 154(b) by 318 days.

(21) Appl. No.: 17/695,899

(22) Filed: Mar. 16, 2022

(65) Prior Publication Data

US 2022/0321530 A1   Oct. 6, 2022

(30) Foreign Application Priority Data

Mar. 30, 2021   (IN) .............................. 202111014589

(51) Int. Cl.
*H04L 9/40*   (2022.01)
(52) U.S. Cl.
CPC ................... *H04L 63/0236* (2013.01)
(58) Field of Classification Search
CPC .................................................. H04L 63/0236
See application file for complete search history.

(56) References Cited

U.S. PATENT DOCUMENTS

| 5,940,591 | A | 8/1999 | Boyle et al. |
| 6,304,975 | B1 | 10/2001 | Shipley |
| 8,402,525 | B1 | 3/2013 | Shah et al. |
| 8,627,442 | B2 * | 1/2014 | Ji ............................. H04L 63/02 726/11 |
| 9,338,181 | B1 * | 5/2016 | Burns ................... H04L 63/1433 |
| 9,426,125 | B2 | 8/2016 | Phonsa et al. |

(Continued)

FOREIGN PATENT DOCUMENTS

| CN | 104361283 A | 2/2015 | |
| IN | 201911007700 A * | 3/2019 | ............. G06F 21/44 |
| KR | 100670802 B1 | 1/2007 | |

OTHER PUBLICATIONS

NPL Search History (Year: 2024).*

*Primary Examiner* — Samson B Lemma
*Assistant Examiner* — Richard W Cruz-Franqui
(74) *Attorney, Agent, or Firm* — Kendal M. Sheets

(57) ABSTRACT

The invention relates to method and system for enhancing computer network security. The method includes receiving a plurality of requests from client devices to avail a plurality of responses from services running on servers; determining a URL pattern for each of the plurality of requests based on URL associated with that request; determining a request data signature for each of the plurality of requests or a response data signature for each of the plurality of responses based on a set of request parameters associated with that request or based on a set of response parameters associated with that response, respectively, using a first machine learning model; and determining an authenticity of each of the plurality of requests based on the URL pattern and the data signature associated with that request, or an authenticity of each of the plurality of responses based on the data signature associated with that response.

20 Claims, 3 Drawing Sheets

(56) References Cited

U.S. PATENT DOCUMENTS

| | | |
|---|---|---|
| 9,609,478 B2 | 3/2017 | Frenz et al. |
| 9,619,649 B1 * | 4/2017 | Yun ........................ G06F 21/56 |
| 9,936,005 B1 * | 4/2018 | Palladino ................ H04L 67/56 |
| 10,097,624 B1 * | 10/2018 | Palladino ................ H04L 67/56 |
| 10,521,246 B1 * | 12/2019 | Jain ........................ G06F 9/547 |
| 10,581,800 B2 | 3/2020 | Morrison |
| 10,657,992 B2 | 5/2020 | Biskeborn et al. |
| 10,795,992 B2 | 10/2020 | Dykes |
| 10,853,431 B1 * | 12/2020 | Lin ........................ G06F 16/958 |
| 11,366,660 B1 * | 6/2022 | Dhandhania ........... G06N 20/00 |
| 11,418,485 B2 * | 8/2022 | Liu ..................... H04L 63/1483 |
| 11,645,449 B1 * | 5/2023 | Ritchie ............. G06Q 30/0282 |
| | | 715/230 |
| 2002/0184533 A1 * | 12/2002 | Fox ..................... H04L 63/1433 |
| | | 709/224 |
| 2007/0255704 A1 | 11/2007 | Baek et al. |
| 2007/0266148 A1 * | 11/2007 | Ruiz ....................... H04L 43/50 |
| | | 709/224 |
| 2014/0379885 A1 * | 12/2014 | Krishnamurthy ..... H04L 69/329 |
| | | 709/223 |
| 2015/0242376 A1 * | 8/2015 | Parikh ................. G06F 16/9535 |
| | | 715/234 |
| 2017/0132068 A1 * | 5/2017 | Parra .................... G06F 11/0793 |
| 2018/0074818 A1 * | 3/2018 | Carmack ................. G06F 8/73 |
| 2018/0115578 A1 * | 4/2018 | Subbarayan ........ G06F 21/6281 |
| 2018/0183823 A1 * | 6/2018 | Fadlil ...................... G06F 11/00 |
| 2018/0324208 A1 * | 11/2018 | Eliyahu ................ H04L 63/1416 |
| 2018/0357543 A1 * | 12/2018 | Brown .................. G06N 3/044 |
| 2019/0037005 A1 * | 1/2019 | Palladino ............ H04L 67/1004 |
| 2019/0080260 A1 * | 3/2019 | Acuna Agost ..... G06Q 30/0275 |
| 2019/0272479 A1 * | 9/2019 | Mars ..................... G06F 18/217 |
| 2020/0117523 A1 | 4/2020 | Morrison et al. |
| 2020/0162484 A1 * | 5/2020 | Solis Agea ........... G06F 21/566 |
| 2020/0272912 A1 * | 8/2020 | Chacko ...................... G06F 9/547 |
| 2021/0182732 A1 * | 6/2021 | Peng ........................ G06N 5/04 |
| 2022/0021655 A1 * | 1/2022 | Ramaswamy ...... H04L 41/5006 |
| 2022/0272125 A1 * | 8/2022 | Tora ....................... G06N 20/00 |
| 2023/0118240 A1 * | 4/2023 | Wong .................... G06N 3/045 |
| | | 705/44 |

\* cited by examiner

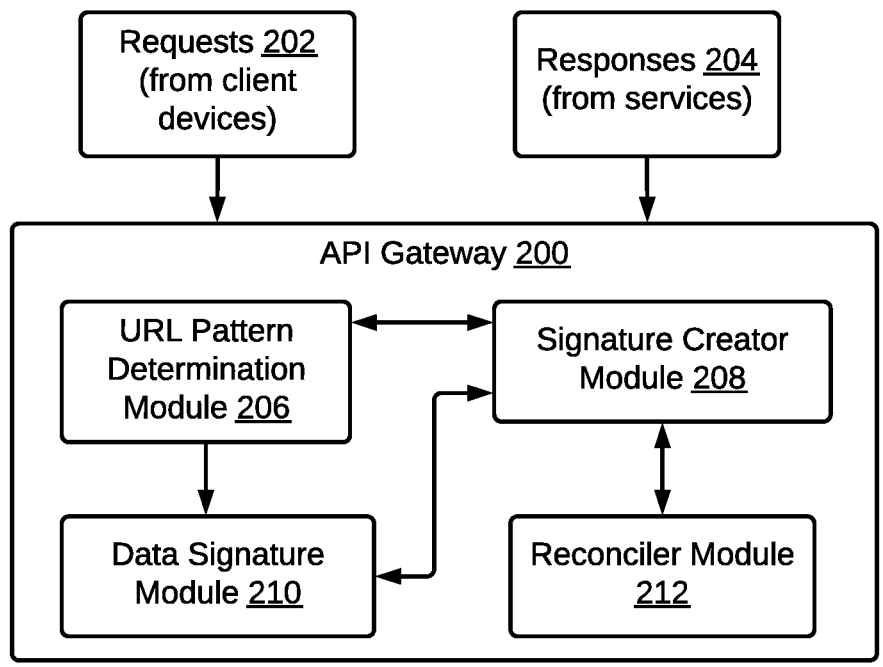
FIG. 2
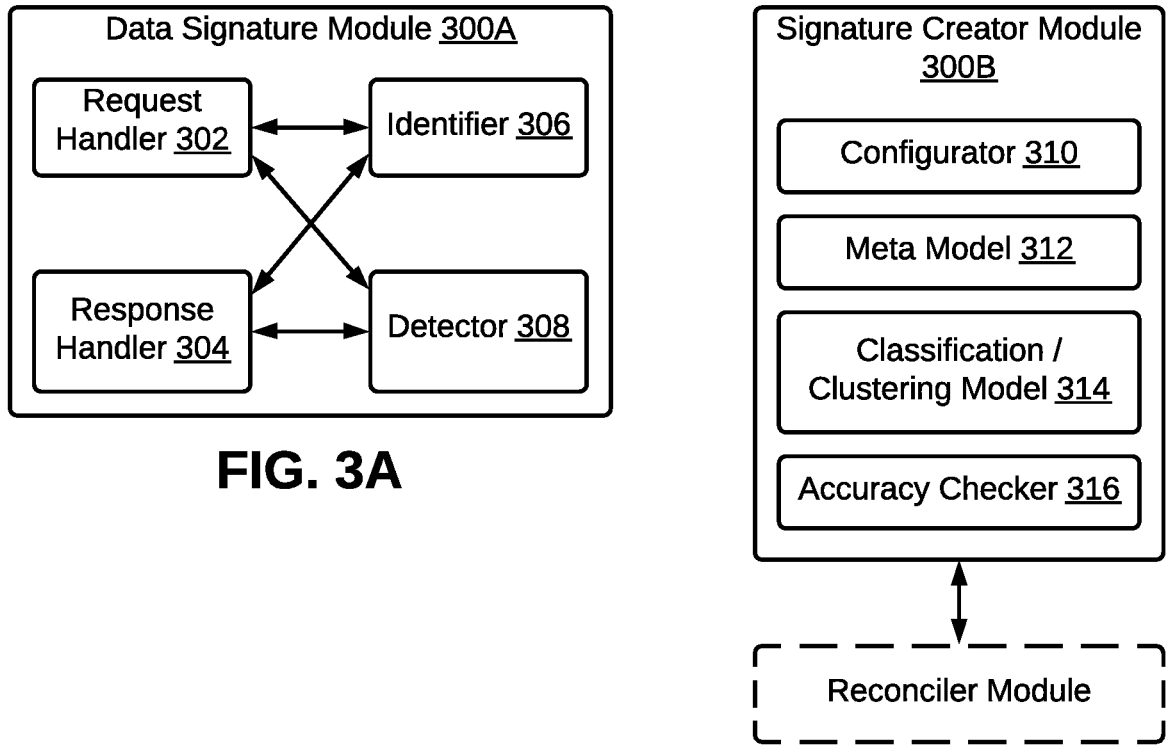
FIG. 3A
FIG. 3B

METHOD AND SYSTEM FOR ENHANCING COMPUTER NETWORK SECURITY

TECHNICAL FIELD

Generally, the invention relates to computer network security. More specifically, the invention relates to a method and system for enhancing computer network security using intelligent Application Programming Interface (API) gateways.

BACKGROUND

Usually, an Application Programming Interface (API) gateway acts on requests and responses received from client devices and services, respectively. The requests and the responses may be processed through the API gateway. By way of an example, API gateways enable communication between the client devices and the services in a same way as a user interface facilitates communication between a human and a computing device. Further, API calls may be typically sent back and forth between the client devices and services running on one or more server, as the requests and the responses. Typically, there are various types of API gateways are available including RESTful, JSON-RPC, SOAP, XML-RPC, etc. Further, an unprotected API gateway from advanced persistent attacks may be one of the reasons of an unprotected computer network.

Today, various systems and methods are available enhancing the computer network security. However, the existing systems and methods may require more complex configuration to provide security. Further, some of the existing systems and methods may provide security from known attacks (for example, the attacks with familiar signatures) only and may fail to block unacceptable data, when an advanced catastrophic attack is introduced. Moreover, the existing systems and methods providing the security may not be cost and time efficient.

Therefore, there is a need to develop a system and method that may effectively identify the unacceptable data (for example, an inappropriate request or response), and block the data even in the case of advanced or new catastrophic attack, thereby ensuring the network security.

SUMMARY

In one embodiment, a method for enhancing computer network security is disclosed. The method may include receiving a plurality of requests from a plurality of client devices to avail a plurality of responses from a plurality of services running on one or more servers. It should be noted that each of the plurality of requests may include a Uniform Resource Locator (URL) for a corresponding service and a set of request parameters, while each of the plurality of responses may include a set of response parameters. The method may further include determining a URL pattern for each of the plurality of requests, based on the URL associated with that request. The method may further include determining a request data signature for each of the plurality of requests or a response data signature for each of the plurality of responses based on the set of request parameters associated with that request or based on the set of response parameters associated with that response, respectively, using a first machine learning model. The first machine learning model may learn to determine the data signature for a request and for a response over a predefined period of time and until a predefined percentage accuracy is attained. The method may further include determining an authenticity of each of the plurality of requests based on the URL pattern and the data signature associated with that request, or an authenticity of each of the plurality of responses based on the data signature associated with that response. The authenticity may be indicative of a potential security vulnerability.

In another embodiment, an Application Programming Interface (API) gateway for enhancing computer network security is disclosed. The API gateway may include a processor and a memory communicatively coupled to the processor. The memory may store processor-executable instructions, which, on execution, may cause the processor to receive a plurality of requests from a plurality of client devices to avail a plurality of responses from a plurality of services running on one or more servers. It should be noted that each of the plurality of requests may include a Uniform Resource Locator (URL) for a corresponding service and a set of request parameters, while each of the plurality of responses may include a set of response parameters. The processor-executable instructions, on execution, may further cause the processor to determine a URL pattern for each of the plurality of requests, based on the URL associated with that request. The processor-executable instructions, on execution, may further cause the processor to determine a request data signature for each of the plurality of requests or a response data signature for each of the plurality of responses based on the set of request parameters associated with that request or based on the set of response parameters associated with that response, respectively, using a first machine learning model. The first machine learning model may learn to determine the data signature for a request and for a response over a predefined period of time and until a predefined percentage accuracy is attained. The processor-executable instructions, on execution, may further cause the processor to determine an authenticity of each of the plurality of requests based on the URL pattern and the data signature associated with that request, or an authenticity of each of the plurality of responses based on the data signature associated with that response. The authenticity may be indicative of a potential security vulnerability.

In yet another embodiment, a non-transitory computer-readable medium storing computer-executable instruction for enhancing computer network security is disclosed. The stored instructions, when executed by a processor, may cause the processor to perform operations including receiving a plurality of requests from a plurality of client devices to avail a plurality of responses from a plurality of services running on one or more servers. It should be noted that each of the plurality of requests may include a Uniform Resource Locator (URL) for a corresponding service and a set of request parameters, while each of the plurality of responses may include a set of response parameters. The operations may further include determining a URL pattern for each of the plurality of requests, based on the URL associated with that request. The operations may further include determining a request data signature for each of the plurality of requests or a response data signature for each of the plurality of responses based on the set of request parameters associated with that request or based on the set of response parameters associated with that response, respectively, using a first machine learning model. The first machine learning model may learn to determine the data signature for a request and for a response over a predefined period of time and until a predefined percentage accuracy is attained. The operations may further include determining an authenticity of each of the plurality of requests based on the URL pattern and the data signature associated with that request, or an authenticity of each of the plurality of responses based on the data signature associated with that response. The authenticity may be indicative of a potential security vulnerability.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIG. 2 illustrates a functional block diagram of an exemplary Application Programming Interface (API) gateway, in accordance with some embodiments of the present disclosure.

FIG. 3A illustrates a block diagram of an exemplary data signature module within the API gateway, in accordance with some embodiments of the present disclosure.

FIG. 3B Illustrates a block diagram of an exemplary signature creator module within the API gateway, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
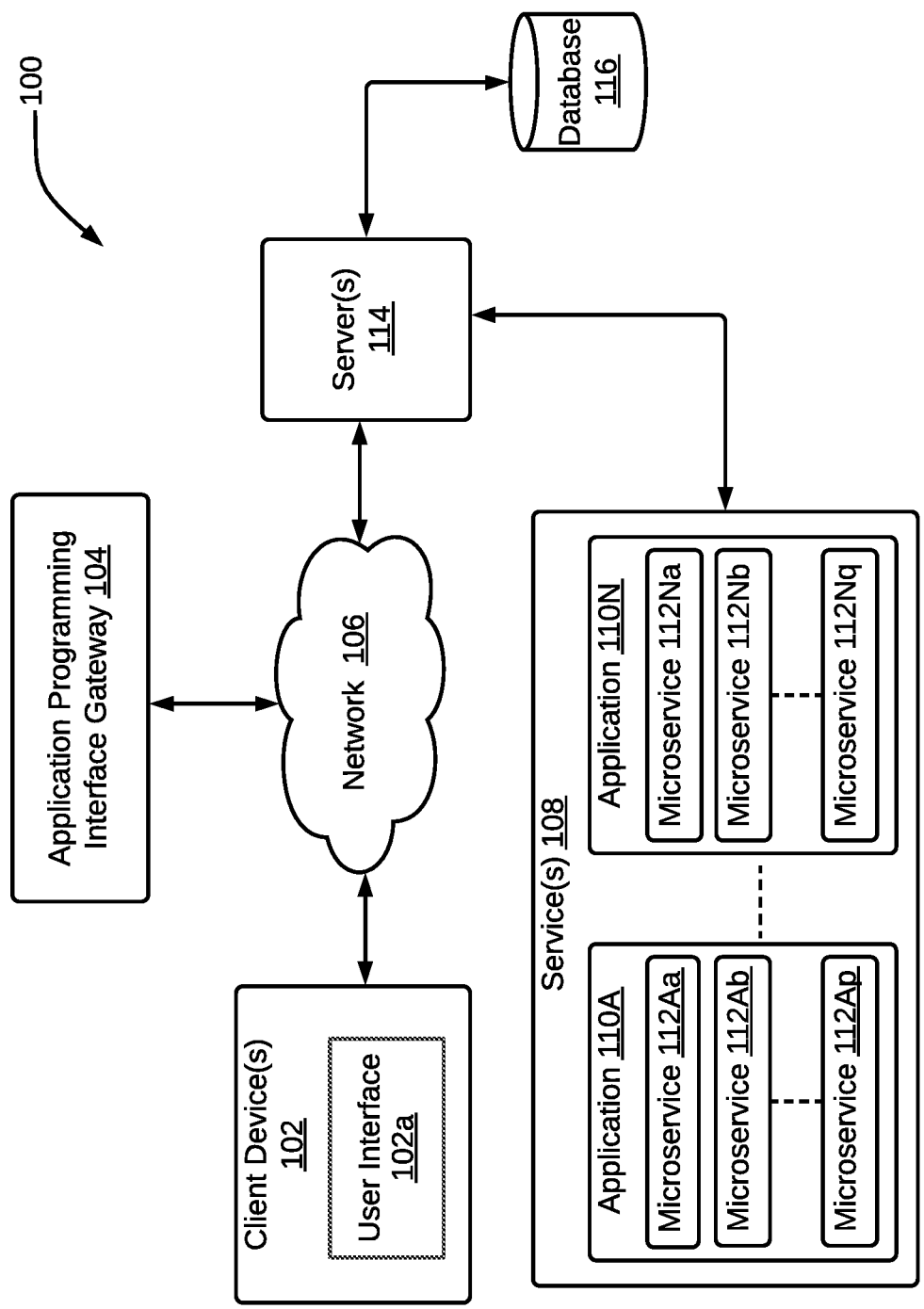
FIG. 1 illustrates a block diagram of an exemplary computer network environment in which various embodiments for enhancing computer network security may be employed.

Referring now to FIG. 1, a block diagram of an exemplary computer network environment 100, in which various embodiments for enhancing computer network security may be employed, is illustrated. The computer network environment 100 may include one or more client devices 102 and one or more servers 114, each communicatively connected to a network 106. Examples of the client devices 102 may include, but may be not limited to, a desktop, a laptop, a notebook, a tablet, a smartphone, a mobile phone, or the like. Similarly, examples of the servers 114 may include, but may be not limited to, a web server, an application server, or the like. In some embodiments, a client device may include a memory, a processor, and a display device (not shown in FIG. 1). The display device may render a user interface 102a. A server 114 may be communicatively coupled to a database 116 and run one or more services 108. It should be noted that the service 108 may include a microservice for an application. By way of an example, there may be 'n' number of applications running on the server(s) 114 (i.e., application 110A to application 110N). Further, each application may include a plurality of micro-services. For example, the application 110A includes ID' number of microservices, i.e., microservice 112Aa to microservice 112Ap, and the application 110N may include 'q' number of microservices, i.e., microservice 112Na to microservice 112Nq. A user or an administrator may input a request through the user interface 102a of the client device 102 to avail a response from a service 108 running on a server 114. By way of an example, the request may include a Uniform Resource Locator (URL) for a corresponding service and a set of request parameters, while the response may include a set of response parameters.

The computer network environment 100 may further include an Application Programming Interface (API) gateway 104. The API gateway 104 may be an intelligent self-learning API gateway. The API gateway 104 may interact with the client devices 102 and/or the servers 114 for sending/receiving various data (for e.g., for sending request, and for receiving response), via the network 106. The API gateway 104 may receive the requests initiated by the client devices 102 and the response provided by the services running on the servers 114. The network 106 may correspond to a communication network. The network 106 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

The API gateway 104 may include a memory and a processor (not shown in FIG. 1). The memory may store instructions that, when executed by the processor, cause the processor to perform various functions so as to enhance the computer network security, in accordance with some embodiments of the present invention. The various functions may include, but may be not limited to, URL pattern determination, request data signature determination, response data signature determination, authenticity determination for the requests and the responses, aberration detection, accuracy verification, and notification generation. This may be further explained in greater detail in conjunction with FIGS. 2-4. The memory may also store various data (e.g., learnt URL patterns, and data signatures, aberration tags etc.) that may be captured, processed, generated, and/or required by API gateway 104. The memory may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

In order to enhance the computer network security, the API gateway 104 may check authenticity of the request received from the client device(s) 102. Further, in order to enhance the computer network security, the API gateway 104 may check authenticity of the response, received from the server(s) 114, corresponding to the request from the client device(s) 102. In other words, the request and the response may be processed by the API gateway 104 so as to determine any potential security vulnerability and take appropriate risk mitigating actions. In some embodiments, the API gateway 104 may interact with the user or administrator via the client device(s) 102 over the network 106. In such embodiments, the API gateway 104 may render the results to the user/administrator via the user interface 102a over the client devices 102.

Referring now to FIG. 2, a functional block diagram of an exemplary Application Programming Interface (API) Gateway 200 (similar to the API gateway 104) is illustrated, in accordance with some embodiments of the present disclosure. FIG. 2 is explained in conjunction with FIG. 1. The API gateway 200 may be configured for enhancing computer network security. In some embodiments, the API gateway 200 may learn and perform classification to determine data signatures. And, upon evolving for a configured period/pre-defined period the API gateway 200 may freeze, when a pre-defined percentage accuracy, for example 99.99% accuracy on a daily average base, is attained. Once the API gateway 200 learns defined patterns of data signatures, it may check the flow and generate a notification to alert or for reconciling learning, upon identifying a change. Further, the API gateway 200 may process requests 202 to services/microservices running on servers, based on its classification derived from self-learning of pattern structure with respect to URL patterns, request data signatures, and response data signatures, in order to ensure safety from catastrophic attacks. In short, the API gateway 200 may determine a call and learn patterns, and after its learning period, the API gateway 200 may automatically act and handle the requests 202 as well as responses 204.

The API gateway 200 may perform various operations to enhance computer network security. Further, to perform various operations, the API gateway 200 may include a URL pattern determination module 206, a signature creator module 208, a data signature module 210, and a reconciler module 212. Additionally, the API gateway 200 may also include a database (not shown in FIG. 2) to store various data and intermediate results generated by the modules 206-212.

The URL pattern determination module 206 may receive the requests 202. A request may include a Uniform Resource Locator (URL) for a corresponding service and a set of request parameters. Further, the URL pattern determination module 206 in conjunction with the signature creator module 208 may be configured for determining a URL pattern for each of the requests 202, based on the URL associated with that request. The signature creator module 208 may employ at least one of a rule engine, a knowledge base, or a second machine learning (ML) model, to determine the URL patterns. The second ML model may employ a clustering algorithm to perform pattern detection. The requests 202 may be received from different clients or client devices, such as, a mobile, and a web application with at least one of Representational state transfer (REST) protocol, Hypertext Transfer protocol (HTTP), Advanced Message Queuing Protocol (AMQP), or Message Queuing Telemetry Transport (MQTT) protocol.

The data signature module 210 may receive the requests 202, and the responses 204 corresponding to processed requests (i.e., authentic requests). The responses 204 may be received from the services running on one more server. It should be noted that a service may further include a plurality of micro services (as illustrated in FIG. 1). Further, the data signature module 210 in conjunction with the signature creator module 208 may be configured to determine authenticity of the requests 202 and the responses 204. The signature creator module 208 may employ a first ML model, to determine data signatures. The first ML model may employ a classification algorithm to determine classification of the data signature. The authenticity of the requests 202 may be determined based on corresponding URL patterns and data signatures associated with the requests 202. Similarly, the authenticity of the responses 204 may be determined based on the data signatures associated with the responses. The authenticity may indicate a potential security vulnerability.

In some embodiments, a preventive action corresponding to the potential security vulnerability may be performed. In other words, at least one of the plurality of requests or at least one of the plurality of responses may be blocked based on the authenticity of the at least one of the plurality of requests or based on the authenticity of the at least one of the plurality of responses, respectively. Detailed functioning of the data signature module 210 may be explained in conjunction with FIG. 3A.

As stated above, the signature creator module 208 may determine the URL pattern and/or the data signatures by employing one or more of the rule engine, the knowledge base, the first ML model, or the second ML model. For the requests 202, the signature creator module 208 may be configured to determine the request data signatures based on the URL and the set of request parameters associated with the requests 202. Similarly, for the responses 204, the signature creator module 208 may be configured to determine the response data signatures based on the set of response parameters associated with the responses. The signature determination may be evolved for pre-defined period and then it may freeze when a pre-defined percentage accuracy (say, about 99%) is achieved. The signature creator module 208 may further be explained in detail in conjunction with FIG. 3B.

The reconciler module 212 may be configured to learn/re-learn changes in patterns, data, request, and other criteria. Further, the reconciler module 212 may help facilitate in the self-learning and provide inputs and process outputs, seamlessly. When accuracy of determining the data-signatures is below a predefined percentage accuracy, a notification module (not shown in FIG. 2) may generate and transmit a notification to the reconciler module 212 for reconciling learning of the first or the second machine learning model.

Referring now to FIG. 3A, a block diagram of an exemplary data signature module 300a (analogous to the data signature module 210) within an API gateway is illustrated, in accordance with some embodiments of the present disclosure. The data signature module 300a may include a request handler 302, a response handler 304, an identifier 306, and a detector 308. The request handler 302 may handle the requests received from the client devices. In some embodiments, request handler 302 may be configured to determine the authenticity of the requests. The request handler 302 may interact with the identifier 306 and the detector 308 in order to determine the authenticity of the requests. Further, the URL pattern and/or the set of request parameters may be considered by the request handler 302 to determine the authenticity of the requests.

In a similar fashion, the response handler 304 take care of the responses received from the services. The response handler 304 may determine the authenticity of the responses. Further, the response handler 304 may interact with the identifier 306 and the detector 308 in order to determine the authenticity of the responses. The set of response parameters my be considered by the response handler 304 to determine the authenticity of the responses. The set of request and response parameters may include meta information associated with the requests and the responses. The meta information associated with the requests and the responses may further include, but may be not limited to, a data size, an identification of a user agent, a geographical location, a Multipurpose Internet Mail Extensions (MIME) type, a content, a cookie, an authentication credentials, a cache, a user role and permission.

The identifier 306 may identify a corruption in at least one of the cookie, the content, and the cache. In some embodiments, the identifier 306 may process the set-cookie flag as well as the value of cookie in each cookie to determine whether the data is modified or tampered. The identifier 306 may then mark such cookie with red flags. Similarly, in some embodiments, the identifier 306 may process the set-cache flag as well as the value of cache to determine whether the data is modified or tampered. The identifier 306 may then mark such cache with red flags. Further, identifier 306 may process the content to determine possible error codes in the content. It should be noted that the possible error codes may be due to application's API error or corrupted content. Further, the identifier 306 may identify an aberration in at least one of the authentication credentials, the user role and permission, and a hit rate per session. In some embodiments, the identifier 306 may identify an aberration in the user role and permission by analyzing patterns in the JavaScript Object Notation (JSON) Web Token (JWT).

The detector 308 may be configured to detect an aberration in at least one of the data size, the user agent, the geographic location, the MIME type, and the data signature. By way of example, the detector may detect if the data size is in a range that the microservice API would expect for request or response. If anything is deviating, then the system would isolate such calls. Similarly, by way of example, the user agent used for accessing the API is determined so as to keep track of any aberration. Further, the geographic details may be captured and analyzed so as to pre-process the request and post handle without any hindrance. The detector 308 may detect a content data signature based on the content type, and may detect the content type based on the content. The content type may include, but not be limited to, JSON file, Extensible Markup Language (XML), text, Hypertext Markup Language (HTML), image, document, JavaScript (JS), Cascading Style Sheets (CSS), and static file. By way of example, the data signature for JSON and XML may be schema, for HTML and other files may be header//footer detection, for static file may be Message-Digest algorithm 5 (MD5).

Referring now to FIG. 3B, a block diagram of an exemplary signature creator module 300b (analogous to the signature creator module 208) within an API gateway is illustrated, in accordance with some embodiments of the present disclosure. The signature creator module 300b may include a configurator 310, a meta model 312, a classification/clustering model 314, and an accuracy checker 316.

The configurator 310 may be configured to cater the requested data. Further, the configurator 310 may understand the URL patterns associated with the requests and the set of request parameters. Based on the understanding the configurator 310 may be configured to communicate with any microservice and fetch corresponding responses. If a request is initiated with some special permissions, then the configurator 310 may re-intercept and respond on case to case basis.

The meta model 312 may intercept incoming data (e.g., request and response) and create a schema for signature creation and/or determination. The meta model 312 may process and identify/categorize the intercepted data based on the field names for the set of request/response parameters and their corresponding values. In other words, field names or values on each request or response are tagged for training the first ML model (i.e., classification model) and/or the second ML model (i.e., clustering model). The trained model may be subsequently employed to determine URL pattern and/or determine data signatures.

In some embodiments, the classification/clustering model 314 may be configured to learn the data signatures/URL pattern for requests and for responses. In particular, the clustering model 314 may be configured to learn to predict the URL pattern for requests. Further, the classification model 314 may learn to predict the aberration/corruption tags for each of the requests or for the responses based on a value of each of the request parameters or based on a value of each of the response parameters, respectively. The classification model 314 may learn the data signatures till the percentage accuracy reaches a pre-defined percentage accuracy (say, about 99%). As will be appreciated, the learning or training of the classification/clustering model 314 happens based on the in-memory database, before processing the request/response (i.e., performing predictions for the request/response). Further, the classification model 314 may take responsibility of determining the accuracy of the data signatures through the accuracy checker 316 and handle the responses in the microservices. Further, the classification model 314 may switch to a fallback storage and save for future learning in case of any downtime or so. In some embodiments, the classification model 314 may communicate with the reconciler module when re-learning or any logical changes are required or at a periodic interval (say, every fortnight or every month).

The accuracy checker 316 may process the vital and potential data and end-to-end mapping for any request/response. The accuracy of matching on request/response are stored in the database and catered accordingly. If the classification/clustering model 314 is not predicting within error limits of predefined accuracy, then accuracy checker 316 may initiate notification for reconciling on the learning by way of providing other criteria.

It should be noted that the API gateway 104, 200 may be implemented in programmable hardware devices such as programmable gate arrays, programmable array logic, programmable logic devices, or the like. Alternatively, the API gateway 104, 200 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for enhancing computer network security. For example, the exemplary computer network environment 100 and associated API gateway 104 may enhance the computer network security, by the process discussed herein. In particular, as will be appreciated by those of ordinary skill in the art, control logic and/or automated routines for performing the techniques and steps described herein may be implemented by the API gateway 104 either by hardware, software, or combinations of hardware and software. For example, suitable code may be accessed and executed by the one or more processors on the API gateway 104 to perform some or all of the techniques described herein. Similarly, application specific integrated circuits (ASICs) configured to perform some or all the processes described herein may be included in the one or more processors on the API gateway 104.

Figure 4:
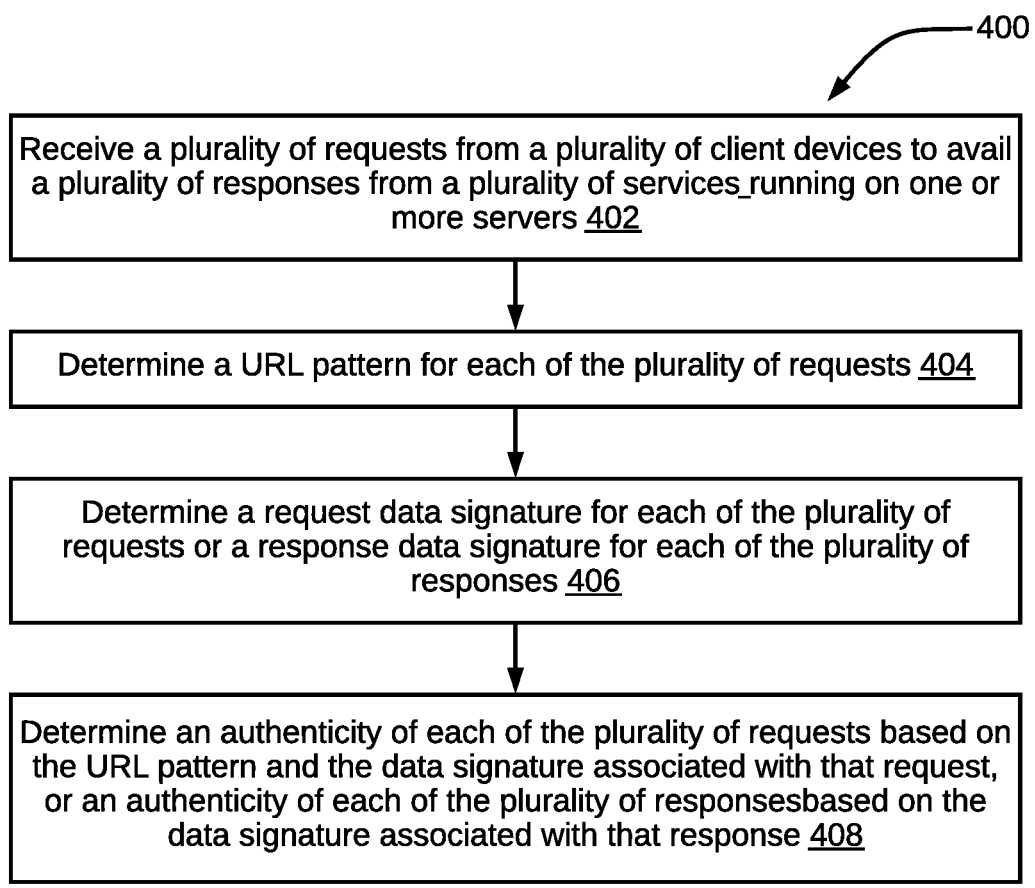
FIG. 4 illustrates a flow diagram of an exemplary process for enhancing computer network security, in accordance with some embodiments of the present disclosure.

Referring now to FIG. 4, an exemplary process 400 for enhancing computer network security is depicted via a flow diagram, in accordance with some embodiments of the present disclosure. Each step of the process 400 may be performed by an API gateway (similar to the API gateway 104 and 200). FIG. 4 is explained in conjunction with FIGS. 1-3.

At step 402, a plurality of requests may be received from requests from a plurality of client devices to avail a plurality of responses from a plurality of services. The plurality of services may be running on one or more servers. A request may based on any known or proprietary client/server messaging protocols including, but not limited to, REST protocol, HTTP, AMQP, and MQTT protocol. A service may include a microservice. It should be noted that each of the plurality of requests may include a Uniform Resource Locator (URL) for a corresponding service and a set of request parameters. Also, it should be noted that each of the plurality of responses may include a set of response parameters. Further, the set of request parameters and the set of response parameters may be indicative of meta information associated with a request and a response, respectively. Moreover, the meta information may include one or more of a data size, an identification of a user agent, a geographical location, a Multipurpose Internet Mail Extensions (MIME) type, a content, a cookie, an authentication credentials, a cache, a user role and permission, based on a nature of API and microservice. For example, in some embodiments, the meta information indicating the set of request parameters may include referrer, connection and user-agent, and the meta information indicating the set of request parameters may include server, response code, date and content-type.

Thereafter, at step 404, a URL pattern for each of the plurality of requests may be determined. The URL pattern may be determined based on the URL associated with that request. The URL pattern may be determined using at least one of a rule engine, a knowledge base, or a second machine learning model.

At step 406, a request data signature for each of the plurality of requests or a response data signature for each of the plurality of responses may be determined. To determine the request data signature and the response data signature, the set of request parameters associated with that request or the set of response parameters associated with that response may be considered, respectively. It should be noted that first machine learning model may be employed to determine the request data signature and the response data signature. Further, the first machine learning model may learn to determine a data signature for a request and for a response over a predefined period of time and until a predefined percentage accuracy is attained. In some embodiments, the predefined accuracy may be about 99.9 percent.

In some embodiments, an aberration in at least one of the data size, the user agent, the geographic location, the MIME type, and a content data signature may be detected. The content data signature may be detected based on the content type, and the content type may be detected based on the content. Additionally, in some embodiments, a corruption in at least one of the cookie, the content, and the cache may be identified. Further, in some embodiments, an aberration tag or a corruption tag for each of the plurality of requests or for each of the plurality of responses may be predicted based on a value of each of the set of request parameters or based on a value of each of the set of response parameters, respectively.

Further, in some embodiments, accuracy of determining the data signature by the first machine learning model may be verified, Further, a notification for reconciling learning of the first machine learning model may be generated, when the percentage accuracy of determining the data signature is below the predefined percentage accuracy.

At step 408, an authenticity of each of the plurality of requests based on the URL pattern and the data signature associated with that request, or an authenticity of each of the plurality of responses based on the data signature associated with that response may be determined. Further, the authenticity may be indicative of a potential security vulnerability. In some embodiments, a preventive action corresponding to the potential security vulnerability may be performed. The preventive action may include blocking at least one of the plurality of requests or at least one of the plurality of responses based on the authenticity of the at least one of the plurality of requests or based on the authenticity of the at least one of the plurality of responses, respectively.

Thus, the present disclosure may overcome drawbacks of traditional systems discussed before. The disclosed method and system in the present disclosure may learn the data signatures until a high level of accuracy is attained and automatically starts re-learning when the percentage accuracy goes below a predefined value, thereby provides a more compliant and safer computer network environment. Moreover, the disclosed system may enhance the computer network security without introducing any complex configuration. Further, the disclosed system may also help in reducing overall application development time as well cost.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for enhancing computer network security, the method comprising:
receiving, by an Application Programming Interface (API) gateway, a plurality of requests from a plurality of client devices to avail a plurality of responses from a plurality of services running on one or more servers, wherein each of the plurality of requests comprises a Uniform Resource Locator (URL) for a corresponding service and a set of request parameters, and wherein each of the plurality of responses comprises a set of response parameters;
determining, by the API gateway, a URL pattern for each of the plurality of requests, based on the URL associated with that request;
determining, by the API gateway, a request data signature for each of the plurality of requests based on the respective set of request parameters associated with each of the plurality of requests and a response data signature for each of the plurality of responses based on the respective set of response parameters associated with each of the plurality of responses, using a first machine learning model, wherein the first machine learning model learns to determine the data signature for a request and for a response over a predefined period of time and until a predefined percentage accuracy is attained; and
determining, by the API gateway, an authenticity of each of the plurality of requests based on the respective URL pattern and the respective data signature associated with each of the plurality of requests and an authenticity of each of the plurality of responses based on the respective data signature associated with each of the plurality of responses, wherein the authenticity is indicative of a potential security vulnerability.

2. The method of claim 1, wherein the set of request parameters and the set of response parameters are indicative of meta information associated with a request and a response, respectively, and wherein the meta information comprises at least one of a data size, an identification of a user agent, a geographical location, a Multipurpose Internet Mail Extensions (MIME) type, a content, a cookie, an authentication credentials, a cache, a user role and permission.

3. The method of claim 1, wherein determining the request data signature or the response data signature further comprises:
detecting an aberration in at least one of the data size, the user agent, the geographic location, the MIME type, and a content data signature, wherein the content data signature is detected based on the content type, and wherein the content type is detected based on the content;
identifying a corruption in at least one of the cookie, the content, and the cache; and
identifying an aberration in at least one of the authentication credentials, the user role and permission, and a hit rate per session.

4. The method of claim 1, wherein determining the request data signature further comprises predicting an aberration tag or a corruption tag for each of the plurality of requests based on a value of each of the set of request parameters, and wherein determining the response data signature further comprises predicting an aberration tag or a corruption tag for each of the plurality of responses based on a value of each of the set of response parameters.

5. The method of claim 1, wherein the URL pattern for each of the plurality of requests is determined using one of a rule engine, a knowledge base, or a second machine learning model.

6. The method of claim 1, further comprising:
verifying accuracy of determining the data signature by the first machine learning model; and
generating a notification for reconciling learning of the first machine learning model, when the percentage accuracy of determining the data signature is below the predefined percentage accuracy.

7. The method of claim 1, further comprising performing a preventive action corresponding to the potential security vulnerability, wherein the preventive action comprises blocking at least one of the plurality of requests or at least one of the plurality of responses based on the authenticity of the at least one of the plurality of requests or based on the authenticity of the at least one of the plurality of responses, respectively.

8. An Application Programming Interface (API) gateway for enhancing computer network security, the API gateway comprising:
a processor; and
a memory communicatively coupled to the processor, wherein the memory stores processor-executable instructions, which, on execution, cause the processor to:
receive a plurality of requests from a plurality of client devices to avail a plurality of responses from a plurality of services running on one or more servers, wherein each of the plurality of requests comprises a Uniform Resource Locator (URL) for a corresponding service and a set of request parameters, and wherein each of the plurality of responses comprises a set of response parameters;
determine a URL pattern for each of the plurality of requests, based on the URL associated with that request;
determine a request data signature for each of the plurality of requests based on the respective set of request parameters associated with each of the plurality of requests and a response data signature for each of the plurality of responses based on the respective set of response parameters associated with each of the plurality of responses, using a first machine learning model, wherein the first machine learning model learns to determine the data signature for a request and for a response over a predefined period of time and until a predefined percentage accuracy is attained; and determine an authenticity of each of the plurality of requests based on the respective URL pattern and the respective data signature associated with each of the plurality of requests and an authenticity of each of the plurality of responses based on the respective data signature associated with each of the plurality of responses, wherein the authenticity is indicative of a potential security vulnerability.

9. The API gateway of claim 8, wherein the set of request parameters and the set of response parameters are indicative of meta information associated with a request and a response, respectively, and wherein the meta information comprises at least one of a data size, an identification of a user agent, a geographical location, a Multipurpose Internet Mail Extensions (MIME) type, a content, a cookie, an authentication credentials, a cache, a user role and permission.

10. The API gateway of claim 8, wherein the processor-executable instructions, on execution, further cause the processor to determine the request data signature or the response data signature by:

detecting an aberration in at least one of the data size, the user agent, the geographic location, the MIME type, and a content data signature, wherein the content data signature is detected based on the content type, and wherein the content type is detected based on the content;

identifying a corruption in at least one of the cookie, the content, and the cache; and identifying an aberration in at least one of the authentication credentials, the user role and permission, and a hit rate per session.

11. The API gateway of claim 8, wherein the processor-executable instructions, on execution, further cause the processor to determine the request data signature by predicting an aberration tag or a corruption tag for each of the plurality of requests based on a value of each of the set of request parameters and to determine the response data signature by predicting an aberration tag or a corruption tag for each of the plurality of responses based on a value of each of the set of response parameters.

12. The API gateway of claim 8, wherein the processor-executable instructions, on execution, cause the processor to determine the URL pattern for each of the plurality of requests by using one of a rule engine, a knowledge base, or a second machine learning model.

13. The API gateway of claim 8, wherein the processor-executable instructions, on execution, further cause the processor to:

verify accuracy of determining the data signature by the first machine learning model; and generate a notification for reconciling learning of the first machine learning model, when the percentage accuracy of determining the data signature is below the predefined percentage accuracy.

14. The API gateway of claim 8, wherein the processor-executable instructions, on execution, further cause the processor to perform a preventive action corresponding to the potential security vulnerability, wherein the preventive action comprises blocking at least one of the plurality of requests or at least one of the plurality of responses based on the authenticity of the at least one of the plurality of requests or based on the authenticity of the at least one of the plurality of responses, respectively.

15. A non-transitory computer-readable medium storing computer-executable instructions for enhancing computer network security, the computer-executable instructions configured for:

receiving a plurality of requests from a plurality of client devices to avail a plurality of responses from a plurality of services running on one or more servers, wherein each of the plurality of requests comprises a Uniform Resource Locator (URL) for a corresponding service and a set of request parameters, and wherein each of the plurality of responses comprises a set of response parameters;

determining a URL pattern for each of the plurality of requests, based on the URL associated with that request;

determining a request data signature for each of the plurality of requests based on the respective set of request parameters associated with each of the plurality of requests and a response data signature for each of the plurality of responses based on the respective set of response parameters associated with each of the plurality of responses, using a first machine learning model, wherein the first machine learning model learns to determine the data signature for a request and for a response over a predefined period of time and until a predefined percentage accuracy is attained; and determining an authenticity of each of the plurality of requests based on the respective URL pattern and the respective data signature associated with each of the plurality of requests and an authenticity of each of the plurality of responses based on the respective data signature associated with each of the plurality of responses, wherein the authenticity is indicative of a potential security vulnerability.

16. The non-transitory computer-readable medium of the claim 15, wherein the set of request parameters and the set of response parameters are indicative of meta information associated with a request and a response, respectively, and wherein the meta information comprises at least one of a data size, an identification of a user agent, a geographical location, a Multipurpose Internet Mail Extensions (MIME) type, a content, a cookie, an authentication credentials, a cache, a user role and permission, and wherein the computer-executable instructions are further configured to determine the request data signature or the response data signature by:

detecting an aberration in at least one of the data size, the user agent, the geographic location, the MIME type, and a content data signature, wherein the content data signature is detected based on the content type, and wherein the content type is detected based on the content;

identifying a corruption in at least one of the cookie, the content and the cache; and identifying an aberration in at least one of the authentication credentials, the user role and permission, and a hit rate per session.

17. The non-transitory computer-readable medium of the claim 15, wherein the computer-executable instructions are further configured to determine the request data signature by predicting an aberration tag or a corruption tag for each of the plurality of requests based on a value of each of the set of request parameters and to determine the response data signature by predicting an aberration tag or a corruption tag for each of the plurality of responses based on a value of each of the set of response parameters.

18. The non-transitory computer-readable medium of the claim 15, wherein the computer-executable instructions are further configured to determine the URL pattern for each of the plurality of requests by using one of a rule engine, a knowledge base, or a second machine learning model.

19. The non-transitory computer-readable medium of the claim 15, wherein the computer-executable instructions are further configured to:
   verify accuracy of determining the data signature by the first machine learning model; and
   generate a notification for reconciling learning of the first machine learning model, when the percentage accuracy of determining the data signature is below the predefined percentage accuracy.

20. The non-transitory computer-readable medium of the claim 15, wherein the computer-executable instructions are further configured to perform a preventive action corresponding to the potential security vulnerability, wherein the preventive action comprises blocking at least one of the plurality of requests or at least one of the plurality of responses based on the authenticity of the at least one of the plurality of requests or based on the authenticity of the at least one of the plurality of responses, respectively.

* * * * *